United States Patent [19]
McMaster et al.

[11] 3,763,691
[45] Oct. 9, 1973

[54] METEOROID DETECTOR

[75] Inventors: Leonard R. McMaster, Williamsburg; Sheldon T. Peterson; Frank M. Hughes, both of Hampton, all of Va.

[73] Assignee: The United States of America as represented by the Administrator of the National Aeronautics and Space Administration, Washington, D.C.

[22] Filed: Sept. 27, 1971

[21] Appl. No.: 184,090

[52] U.S. Cl. .................................. 73/12, 73/170 R
[51] Int. Cl. ...................... G01w 1/08, G01n 15/00
[58] Field of Search ........................... 73/12, 170 R; 324/65 R

[56] References Cited
UNITED STATES PATENTS

| | | | |
|---|---|---|---|
| 1,448,540 | 3/1923 | Houskeeper | 324/65 R X |
| 3,407,304 | 10/1968 | Kinard et al. | 73/12 X |
| 3,446,068 | 5/1969 | Slattery et al. | 73/12 X |

*Primary Examiner*—Richard C. Queisser
*Assistant Examiner*—Stephen A. Kreitman
*Attorney*—Howard J. Osborn et al.

[57] ABSTRACT

Use of a cold-cathode discharge tube with a gas-pressurized cell in space for recording a meteoroid puncture of the cell and for determining the size of the puncture.

3 Claims, 1 Drawing Figure

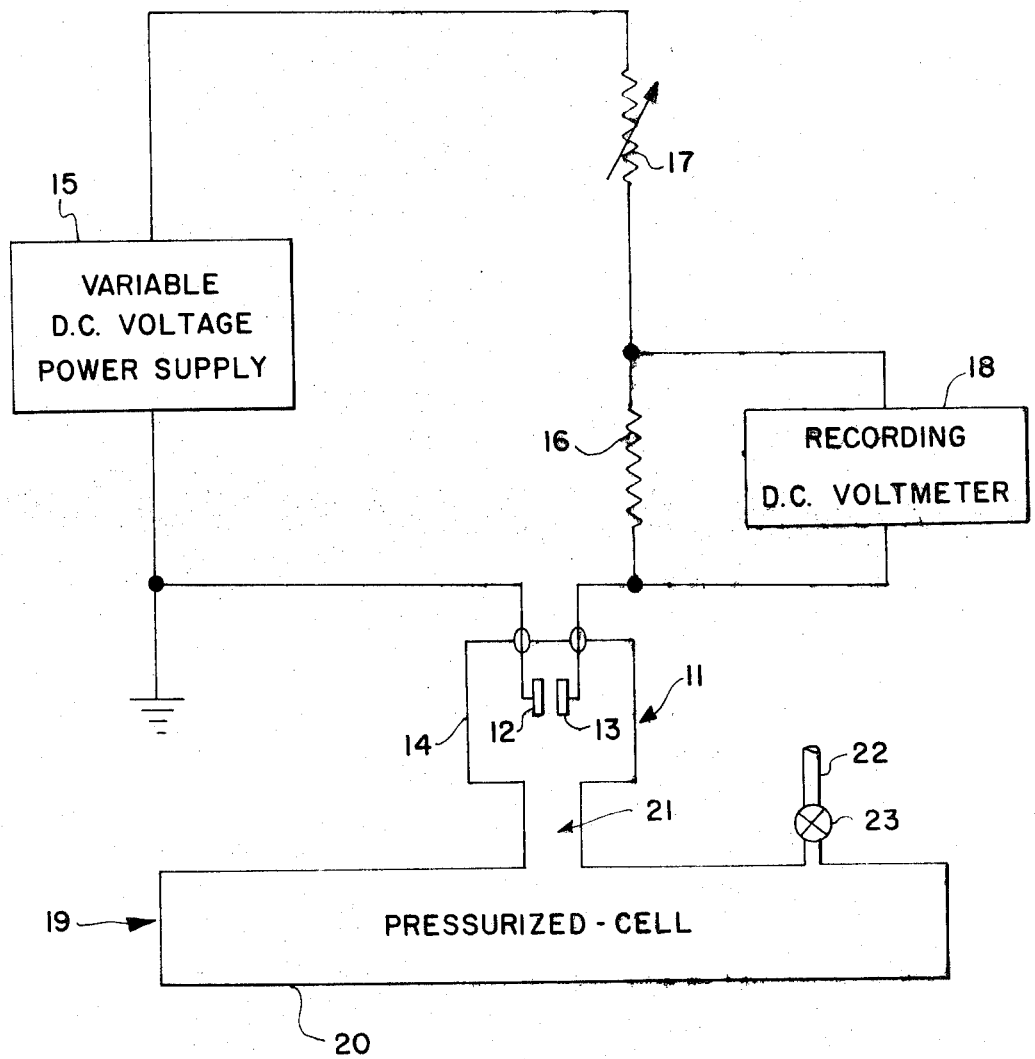

METEOROID DETECTOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to meteoroid detectors and more specifically concerns a meteoroid detector that not only detects a meteoroid but also determines the size of the puncture caused by the meteoroid.

The possible danger in an encounter between meteoroids and spacecraft has resulted in various research activities designed to define the meteoroid environment in space and its effect on spacecraft. The most straightforward way of determining meteoroid hazards to spacecraft is accomplished by penetration techniques. One such technique employs a simple one-shot device referred to as a pressurized cell detector. It consists of a gas-pressurized cell equipped with a pressure sensor. When a meteoroid punctures the cell, the gas leaks out and the loss of pressure is detected by the pressure-sensitive device.

The pressure sensor presently used with the pressurized cell detector is a diaphragm-actuated microswitch. To date no attempt has been made to determine the size of a puncture using these sensors, even though a method exists as follows: two switches are installed and set to actuate at different pressures, the time interval between their actuations giving the leak rate and, thereby, the size of the hole. The weight (0.78 Kg) and size ($3.4 \times 10^{-5} m^3$) of these mechanical switches make their use in large quantities prohibitive and if penetration size is to be obtained, as well as a record of the event, their use is even more undesirable as weight and volume are doubled.

A review of the proposed meteoroid population investigation through interplanetary space, using pressurized cell detectors, indicates a need for a pressure sensor considerably reduced in weight and volume from those currently used.

It is therefore an object of this invention to provide a pressure sensor considerably reduced in weight and volume from those currently used to monitor pressurized cell meteoroid detectors.

Another object of this invention is to provide a meteoroid detector that not only detects a meteoroid but also determines the size of the puncture caused by the meteroid.

Other objects and advantages of this invention will become apparent hereinafter in the specification and drawing.

SUMMARY OF THE INVENTION

The invention includes a sensor for sensing pressure changes inside a gas-pressurized cell. The pressure sensor is a simple cold-cathode glow discharge tube operating with an electric potential applied across two electrodes. The pressure sensor is mounted on the gas-pressurized cell such that the pressurized gas inside the cell is inside the tube. The potential applied across the two electrodes is insufficient to cause a breakdown between the electrodes at the initial molecular density within the cell. However, when the cell is punctured by a meteoroid in space, gas will flow through the puncture into space. The gas density inside the tube will decrease to a value where a discharge, similar to that of a neon glow lamp, will take place. The glow discharge tube operates like a pressure switch, indicating an open circuit before a puncture and indicating a closed circuit, by allowing a current to flow between the electrodes, after a puncture. As the gas density within the detector cell continues to decrease after a breakdown, the current flow between the electrodes also decreases until it can no longer be maintained. Recording the current flow through the discharge tube then gives a time history of the events resulting from the puncture of a detector cell, i.e., a record of the gas leak rate; hence, the size of the puncture can be determined.

BRIEF DESCRIPTION OF THE DRAWING

The sole FIGURE in the drawing is a schematic diagram of an embodiment of the invention.

DETAILED DESCRIPTION OF THE INVENTION

Turning now to the embodiment of the invention selected for illustration in the drawing the number 11 designates a cold-cathode glow discharge tube having electrodes 12 and 13. These electrodes are enclosed by a pressure-tight wall 14. Electrode 12 is connected through wall 14 to ground and to one side of variable d.c. voltage power supply 15. Electrode 13 is connected through wall 14, a resistor 16 and a variable resistor 17 to the other side of power supply 15. A recording d.c. voltmeter 18 is connected across resistor 16. The purpose of variable resistor 17 is to adjust the amplitude of the voltage recorded by voltmeter 18. Tube 11 is attached to a pressurized cell 19, having walls 20. The enclosure of discharge tube 11 is connected to the enclosure of cell 19 through an opening 21 such that the pressure inside tube 11 is the same as the pressure inside cell 19. Walls 20 are exposed to space and are made from any suitable material that will puncture when impacted with a meteoroid. A tube 22 and a valve 23 are used for pressurizing cell 19 with any suitable gas, such as helium.

In the operation of this invention power supply 15 is adjusted to some desired level. Then variable resistor 17 is adjusted so that the voltage across resistor 16 when tube 11 breaks down is within the range of recording d.c. voltmeter 18. Valve 23 is opened and helium is pumped through tube 22 until the pressure inside tube 11 and cell 19 is higher than the breakdown pressure for the particular voltage setting of power source 15. Valve 23 is then closed and cell 19 is put into space. Whenever a meteoroid punctures walls 20 of the helium inside cell 19 begins to leak through the puncture into space. This continues until the pressure inside the cell and discharge tube decreases to a value where a discharge occurs. The resulting conduction produces a voltage drop across resistor 16 which is recorded by voltmeter 18. The cold-cathode discharge tube 11 has thus functioned like a pressure switch, indicating an open circuit before a puncture and indicating a closed circuit by allowing a current to flow between electrodes 12 and 13 after a puncture. As the pressure within cell 19 continues to decrease after breakdown, the current flow between the electrodes will also decrease until a discharge can no longer be maintained. Recording the event of current flow through discharge tube 11 by voltmeter 18 will give a time history record of the puncture of cell 19, i.e., a record of the helium leak rate and, hence, the size of the puncture can be determined. The largest puncture whose size can be determined is a puncture the size of opening 21. If a larger puncture occurs, tube 11 will 'see' it as a puncture the size of opening 21.

The reason tube 11 acts as it does is that a gas in its normal state is almost a perfect insulator, but when an electric field of sufficient intensity is created in the gas between two electrodes, the gas becomes a conductor. This transition from an insulating to a conducting state is called the electrical breakdown. The relationship between the breakdown voltage and the gas pressure, known as Paschen's law, exhibits a minimum breakdown voltage at some medium pressure. At both higher and lower pressures relatively large voltages are required for breakdown. Without the increased electric field, the mean free path of the gas particles is too short at the higher pressures for them to gain enough energy for ionization between successive collisions. At the lower pressures the mean free path is so long that the probability of any collision is very small.

There are two main advantages of this invention over the prior art. First, it provides a means for recording a meteoroid puncture of a cell and for determining the size of the puncture; and second, by using a cold-cathode discharge tube to perform these functions a great saving in both weight and volume is obtained.

It is to be understood that the form of the invention herewith shown and described is to be taken as a preferred embodiment. Various changes may be made without departing from the spirit and scope of the invention as defined in the subjoined claims. For example, a transmitter could be used in place of voltmeter 18 to transmit the history of the conduction of tube 11 to earth before it is recorded. The shapes and sizes of tubes 11 and cell 19 can be different from those shown. And gases other than helium could be used as the pressurizing gas.

What is claimed is:

1. A method for detecting a meteoroid puncture in a cell and for determining the size of the puncture comprising the steps of:

attaching a cold-cathode discharge tube, having two electrodes, to said cell such that said two electrodes are inside said cell;

applying a voltage across two electrodes;

pressurizing said cell with a gas to a level where there is no conduction between said two electrodes;

placing said cell in a space environment; and recording a history of the conduction between said two electrodes whereby the event of a meteoroid puncture and the size of the puncture can be determined from said recorded history.

2. Apparatus for detecting meteoroids in space and for measuring the potential danger of the meteoroids detected comprising:

a cold-cathode discharge tube having two electrodes;

a potential source connected across said two electrodes;

means for recording a history of the conduction between said two electrodes;

a cell, and means connecting the interior of the tube with the interior of the cell, a gas filling the tube, cell and connecting means, the gas being pressurized to such an extent as to prevent conduction between said two electrodes and exposed to space so that when a meteoroid punctures said cell the gas will leak into space decreasing the pressure to a value where there is conduction between said two electrodes and thereafter further decreasing the pressure until there is no conduction between said two electrodes whereby the history recorded by said recording means indicates the event of a puncture and the size of the puncture.

3. Apparatus according to claim 2 wherein said gas is helium.

* * * * *